(12) United States Patent
Kuriyama

(10) Patent No.: US 7,056,357 B2
(45) Date of Patent: Jun. 6, 2006

(54) METHOD FOR MAKING SOLID ELECTROLYTIC CAPACITOR

(75) Inventor: Chojiro Kuriyama, Kyoto (JP)

(73) Assignee: Rohm Co., Ltd, Kyoto (JP)

( * ) Notice: Subject to any disclaimer, the term of this patent is extended or adjusted under 35 U.S.C. 154(b) by 0 days.

(21) Appl. No.: 10/939,126

(22) Filed: Sep. 9, 2004

(65) Prior Publication Data

US 2005/0141172 A1  Jun. 30, 2005

(30) Foreign Application Priority Data

Sep. 10, 2003  (JP) .............................. 2003-317860

(51) Int. Cl.
*H01G 9/00* (2006.01)

(52) U.S. Cl. ....................................... 29/25.03; 427/79
(58) Field of Classification Search ............... None
See application file for complete search history.

(56) References Cited

U.S. PATENT DOCUMENTS

| | | | | |
|---|---|---|---|---|
| 4,975,412 A | * | 12/1990 | Okazaki et al. | 505/491 |
| 6,139,593 A | * | 10/2000 | Kono | 29/25.03 |
| 6,836,401 B1 | * | 12/2004 | Yoshida et al. | 361/538 |
| 2005/0122663 A1 | * | 6/2005 | Poltorak | |

FOREIGN PATENT DOCUMENTS

JP      2003-77769      3/2003

\* cited by examiner

*Primary Examiner*—Ha Tran Nguyen
(74) *Attorney, Agent, or Firm*—Hamre, Schumann, Mueller & Larson, P.C.

(57) ABSTRACT

A method for making a solid electrolytic capacitor including a flat porous body is provided. This method utilizes a mold which includes a horizontal surface and four vertical side surfaces. The horizontal surface and the side surfaces define a cavity into which powder made of valve metal is loaded. By compacting the powder in the cavity, a flat porous body having a predetermined thickness is formed. In the compacting, the powder is compressed vertically with the four side surfaces fixed in position.

13 Claims, 24 Drawing Sheets

METHOD FOR MAKING SOLID ELECTROLYTIC CAPACITOR

BACKGROUND OF THE INVENTION

1. Field of the Invention

The present invention relates to a method for making a solid electrolytic capacitor by utilizing a porous sintered body made of a valve metal.

2. Description of the Related Art

Conventionally, to remove noises generated from a device such as a CPU or stabilize the power supply system of an electronic device, solid electrolytic capacitors are widely used, each including a porous sintered body made of a metal material having valve action (hereinafter simply referred to as "valve metal").

FIGS. 23–26 show an example of conventionally proposed method for making such a solid electrolytic capacitor (see JP-A 2003-77769). As shown in FIG. 23, this manufacturing method uses an apparatus provided with a mold B2 which includes a stationary block 111, four pressing blocks 112A–112D, and a movable block 113. The stationary block 111 and the four pressing blocks 112A–112D define a cavity 117, and a wire 105 is arranged in the cavity. Subsequently, as shown in FIG. 24, valve metal powder 104 is loaded into the cavity 117, and then the powder 104 is covered by the movable block 113. Subsequently, as shown in FIGS. 25 and 26, the four pressing blocks 112A–112D are moved toward the center of the cavity 117 to compact the powder 104 from four sides, thereby providing a porous body. The porous body is then heated and sintered to provide a porous sintered body. By using the porous sintered boy, a solid electrolytic capacitor is made.

Recently, in accordance with an increase in the clock speed of CPUs and in operation speed of electronic devices as well as digitalization of electronic devices, various requirements are placed on capacitors. For example, noise cancellation property for a wide frequency band is demanded. Further, high responsiveness with respect to high frequencies and capability of high power supply are demanded. For fulfilling these demands, to increase the capacitance and to reduce the resistance and impedance of a capacitor are effective.

As a method for increasing the capacitance of a capacitor, it may be considered to make a capacitor by using a plurality of porous bodies. With this method, however, the manufacturing process becomes complicated, and the size of a capacitor increases. It may be considered to attain a desired capacitance by connecting a plurality of capacitors in parallel. In such a case, however, a large number of wires need be used for passing current to the capacitors, and the current path becomes long. As a result, the method poses problems such as an increase in impedance in the wiring pattern, a deterioration in the space efficiency on the substrate and an increase in the manufacturing cost caused by an increase in the number of parts.

In light of the above, it is desirable that the capacitance is increased while using a single capacitor and without increasing the size of the capacitor. In the case of a capacitor made by using a porous sintered body, the capacitance can be increased by increasing the size and density of the porous sintered body and without increasing the size of the capacitor itself.

However, when the size of a porous sintered body increases, the equivalent series resistance and equivalent series inductance increase. To avoid such disadvantages, it may be considered to make the porous sintered body flat. When the porous sintered body is flat, the path of the current flowing through the porous body becomes short. Since the surface area of the porous sintered body increases by making the body flat, the contact area with a graphite layer and a silver layer provided on a surface of the porous sintered body increases. As a result, the resistance and impedance are reduced. Moreover, a capacitor made by using the flat porous sintered body has a relatively small height, which is advantageous for reducing the thickness of the device in which the capacitor is incorporated.

In this way, to fulfill the demands such as an enhanced noise cancellation property for a high frequency band, capability of high power supply and high responsiveness with respect to high frequencies, it is desirable to increase the size and density of the porous sintered body while making the porous sintered body flat.

However, the prior art manufacturing method shown in FIG. 23 has the following problems in forming a large, high-density and flat porous body.

First, to make a large porous body, the volume of the cavity 117 need made large. Accordingly, the travel distance of the four pressing blocks 112A–112D becomes long. Further, to form a porous body having a high density, the ratio of the volumes of the cavity 117 before and after the compacting need be large. For this reason again, the travel distance of the pressing blocks 112A–112D becomes long. As the travel distance of the four pressing blocks 112A–112D increases, the center portion and the peripheral portion of the porous body may differ in distribution density of the powder 104. When the distribution density of the powder 104 is non-uniform in a flat porous body, excessive deformation or breakage due to the insufficient strength may occur in heating and sintering the porous body. Further, when the heating and sintering of the porous body cannot be properly performed due to the non-uniformity in the porous body, a leakage current in the capacitor manufactured by using the porous body increases. Moreover, when the density of the powder 104 is non-uniform, the bonding between the wire 105 arranged in the porous body and the powder 104 becomes insufficient, which may increase the contact resistance between these portions.

Second, in the prior art manufacturing method, the four pressing blocks 112A–112D are used to compact the powder 104 in a direction crossing the thickness direction of the porous body. Therefore, among the obverse surfaces of the porous body, the upper and the lower surfaces oriented in the thickness direction are rubbed against the relevant surfaces of the stationary block 111 and the movable block 113. When the travel distance of the four pressing blocks 112A–112D are increased for increasing the size and density of the porous body, the distance through which the upper and the lower surfaces are rubbed increases. Further, to make a porous body having a high density, the powder need be compacted with a high compressive force, so that the contact pressure between the upper and the lower surfaces and the stationary block 111 and the movable block 113 increases. Therefore, the minute pores existing in the upper and the lower surfaces are liable to be closed or clogged due to the friction. Thus, in the prior art method, it is difficult to form a porous body which is larger than a certain size without causing clogging.

When clogging occurs at a surface of the porous body, an aqueous solution of phosphoric acid for forming a dielectric layer and an aqueous solution of manganese dioxide for forming an electrolyte layer, for example, may not be duly impregnated through the surface and into the porous sintered body made by heating and sintering the porous body. As the porous sintered body becomes flatter, the proportion of the area of the upper and the lower surfaces to the total surface area of the porous sintered body increases. This makes higher the possibility that the formation of the dielectric layer and the electrolyte layer in the porous sintered body is hindered. In such a case, the capacitor cannot duly function as a solid electrolytic capacitor having a polarity. Moreover, when clogging occurs, the contact area between e.g. the graphite layer and the silver layer formed on the surface of the porous sintered body and the electrolyte layer formed at the porous sintered body reduces, whereby the contact resistance between these may increase.

SUMMARY OF THE INVENTION

An object of the present invention, which is conceived under the circumstances described above, is to provide a technique for reliably making a flat porous body having a uniform density.

Another object of the present invention is to provide a solid electrolytic capacitor made by utilizing a large high-density porous body and having a high capacitance.

According to a first aspect of the present invention, there is provided a solid electrolytic capacitor fabrication method which comprises the steps of: loading valve metal powder into a cavity defined by a horizontal surface and vertical side surfaces provided in a mold; and compacting the powder loaded in the cavity. The compacting of the powder is performed in a manner such that the powder is vertically compressed with the side surfaces fixed in position to form a flat porous body having a predetermined thickness in the vertical direction.

According to the present invention, the powder loaded in the cavity is compacted in the thickness direction (vertical direction) of the porous body. With such an arrangement, as compared with the prior art technique, the travel distance (compression distance) in the mold is reduced. As a result, the distribution density of the powder in the porous body can be made relatively uniform. Therefore, problems such as undesirable warping or breaking of the porous body in heating and sintering the porous body can be prevented. Since the travel distance in the mold is small, the clogging of minute pores existing in a surface of the porous body can be suppressed. Therefore, an aqueous solution for forming a dielectric layer and an electrolyte layer can be duly impregnated into the porous body. Further, the contact resistance of a graphite layer and a silver layer formed on a surface of the porous body can be reduced. According to the present invention, the number of movable parts of the mold can be made smaller than that of the prior art shown in FIG. 23 (in which metal powder is compacted from four sides), whereby the structure of the manufacturing apparatus can be made simple.

Preferably, the compacting of the powder is performed by lowering a pressing block from above the cavity toward the cavity with the horizontal surface fixed in position.

Alternatively, the compacting of the powder may be performed by lowering a first pressing block from above the cavity toward the cavity and by simultaneously raising a second pressing block defining the horizontal surface toward the cavity.

Preferably, the mold includes a first movable block which is horizontally movable and has a side surface defining part of the cavity.

Preferably, the method of the present invention further comprises: a wire arranging step in which a wire made of valve metal is caused to project horizontally from the side surfaces of the movable block into the cavity prior to the compacting of the powder; and a step of moving the movable block away from the porous body after the compacting of the powder.

With such a method, the wire can be formed into an anode partially embedded in the porous body, whereby the efficiency of the manufacturing work can be enhanced. The wire is not limited to one having a circular cross section. For example, use may be made of a wire having a rectangular cross section.

Preferably, in the step of moving the movable block away from the porous body, the porous body is held by the mold with a compressive force which is smaller than the compressive force exerted for compacting the powder. With such a method, in moving the movable block away from the porous body, the porous body is prevented from unduly moving or breaking due to an excessive compressive force.

Preferably, the method further comprises the step of cutting the wire at a position spaced from the porous body after the movable block is moved away from the porous body. With such a method, an anode of a desired length can be provided by changing the cutting position of the wire.

Preferably, in the wire arranging step, the wire is arranged to extend through the cavity.

With such a method, an intermediate product including a porous body and an anode penetrating through the porous body can be made efficiently. In a capacitor made by utilizing such an intermediate product, the circuit current can be caused to flow from one end to the other end of the anode. In this case, the electrical resistance of the anode is set lower than that of the porous body, whereby the electrical loss in the capacitor can be suppressed. Further, the heat generation due to current flow is suppressed, which is effective for preventing the firing of the capacitor. Moreover, large power supply and high responsiveness of the capacitor can be realized.

Preferably, the mold may include a second movable block which is formed with a hole for receiving a free end of the wire extending through the cavity.

Preferably, the wire is caused to extend through the cavity with the first and the second movable blocks positioned close to each other so that the distance between the movable blocks is smaller than when the compacting of the powder is performed.

Preferably, the method of the present invention may further comprise a wire arranging step in which a plurality of wires are caused to project horizontally into the cavity prior to the compacting of the powder.

With the above method, an intermediate product including a porous body and a plurality of anodes can be easily formed. In a capacitor made by utilizing such an intermediate product, current can be caused to flow dispersedly through the plural anodes, which leads to a low resistance and a low impedance of the capacitor. Moreover, the capacitor is suitable for blocking noise of a high frequency band.

Preferably, the wires may extend in parallel with each other.

Alternatively, the wires may extend in non-parallel with each other. For example, one of the wires and another one of the wires extend to make an angle of 90 degrees.

Preferably, at least one of the wires may be caused to project from the porous body by a greater amount than the other wires. With such an method, the porous body can be easily transported without receiving damage. Preferably, only one of the anodes is made relatively long, whereas other anodes are made to have a minimum length necessary for the proper working of the capacitor. In such a case, the amount of a wire to be used can be saved.

According to a second aspect of the present invention, there is provided a solid electrolytic capacitor comprising a flat porous body made by compacting valve metal powder. The porous body may have a thickness of no less than 3 mm.

According to a third aspect of the present invention, there is provided a solid electrolytic capacitor comprising a flat porous body which is made by compacting valve metal powder and has a predetermined thickness and a predetermined width. The width of the porous body may be no less than 5 mm.

Other objects, features and advantages of the present invention will become clearer from the description of the preferred embodiment given below.

DETAILED DESCRIPTION OF THE PREFERRED EMBODIMENTS

Preferred embodiments of the present invention will be described below with reference to the accompanying drawings.

FIGS. 1–9 illustrate a solid electrolytic capacitor fabrication method according to a first embodiment of the present invention. In this embodiment, a solid electrolytic capacitor, including a porous sintered body in which two anodes are partially embedded, is manufactured (See FIG. 9).

Figure 1:
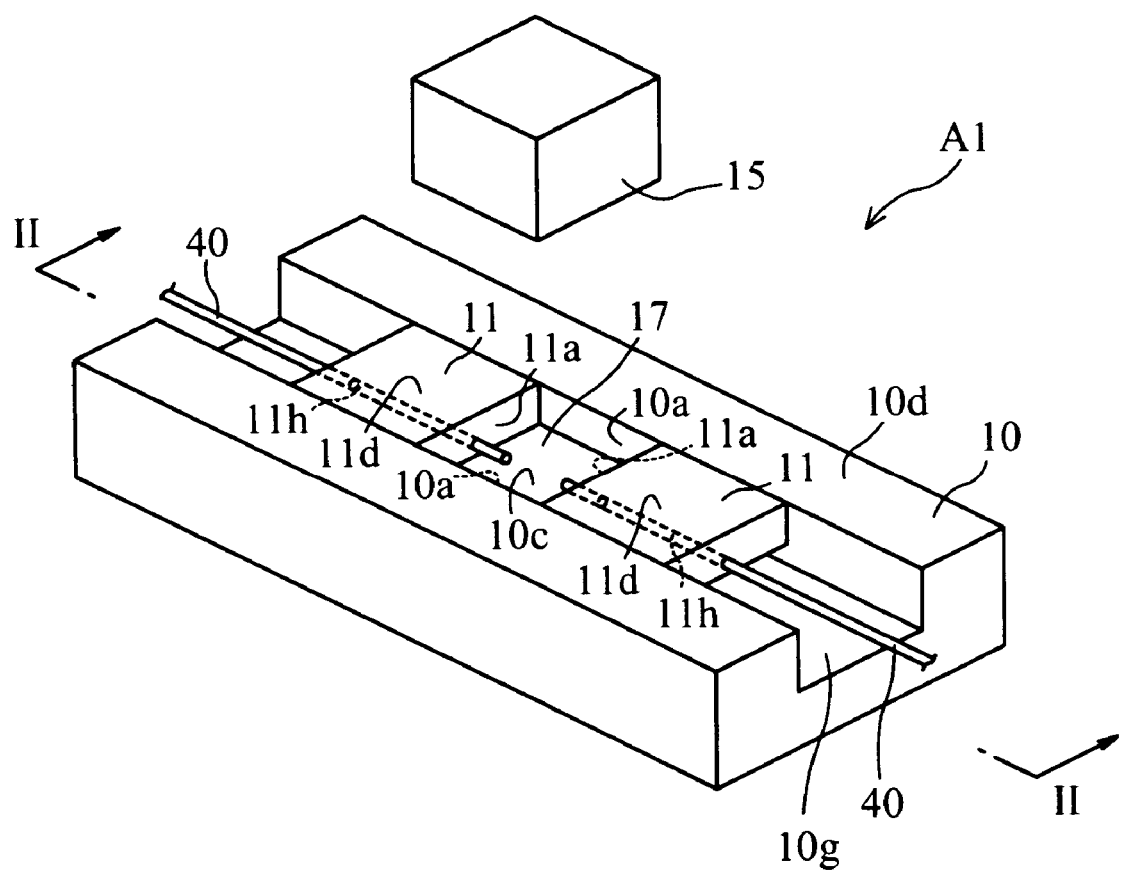
FIG. 1 is a perspective view showing a mold used for the manufacturing method according to a first embodiment of the present invention.

FIG. 1 shows a mold A1 used in the method of this embodiment. The mold A1 includes a stationary block 10 and a pair of movable blocks 11. The stationary block 10 is formed with a groove 10g, in which the movable blocks 11 are movably fitted. The stationary block 10 includes a pair of inner side surfaces 10a and a horizontal surface 10c facing upward. Each of the movable blocks 11 includes an inner side surface 11a. These four side surfaces and the horizontal surface mentioned above define a rectangular cavity 17. In a manufacturing process, the two movable blocks 11 are initially placed at predetermined positions in the stationary block 10 so that the dimension of the cavity 17, as viewed in plan, corresponds to the dimension of the porous body to be made by the steps described below.

Figure 2:
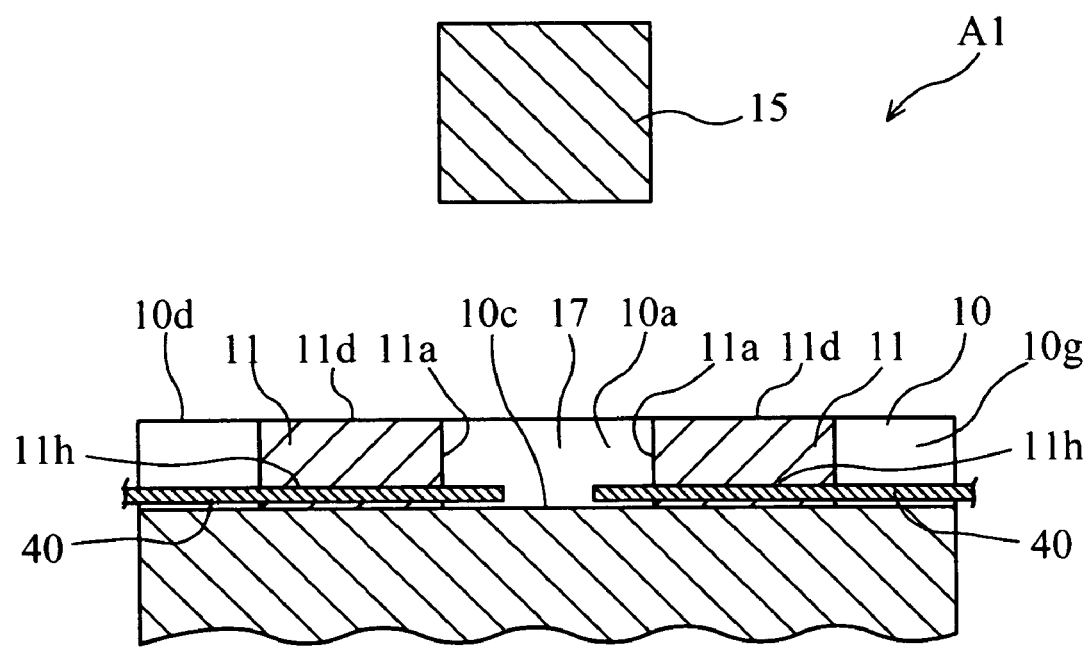
FIG. 2 is a sectional view taken along lines II—II in FIG. 1.

Each movable block 11 is formed with a through-hole 11h extending from the side surface 11a toward the opposite side surface. As shown in FIG. 1, a wire 40 is inserted into the through-hole 11h so as to project from the side surface 11a of the movable block 11 into the cavity 17 by a predetermined amount. The wire 40 is made of a metal material having valve action ("valve metal") utilizing e.g. niobium or tantalum. Though not shown in FIG. 1, for each wire 40, a wire feeder is provided in the neighborhood of the mold A1. The wire feeder feeds wire 40 into the cavity 17, causing the wire to project by a predetermined amount, and then the feeder holds the projected wire. As shown in FIG. 2, the wire 40 inserted in the through-hole 11h is located close to the bottom of the cavity 17. With such an arrangement, when a flat porous body is finally made, the wire 40 is located close to the center of the porous body in the thickness direction. In the present invention, instead of the through-hole 11h, each of the movable block 11 may be formed with a groove capable of receiving the wire 40.

Figure 3:
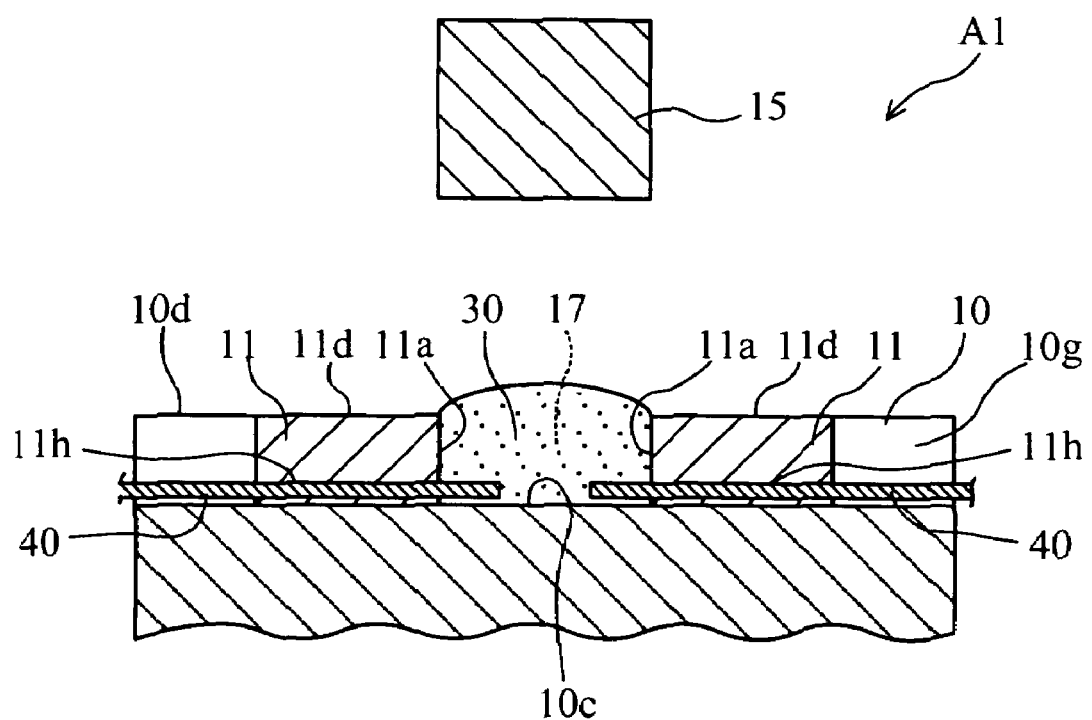
FIG. 3 is a sectional view showing the state in which metal powder is loaded in the cavity defined in the mold.
Figure 4:
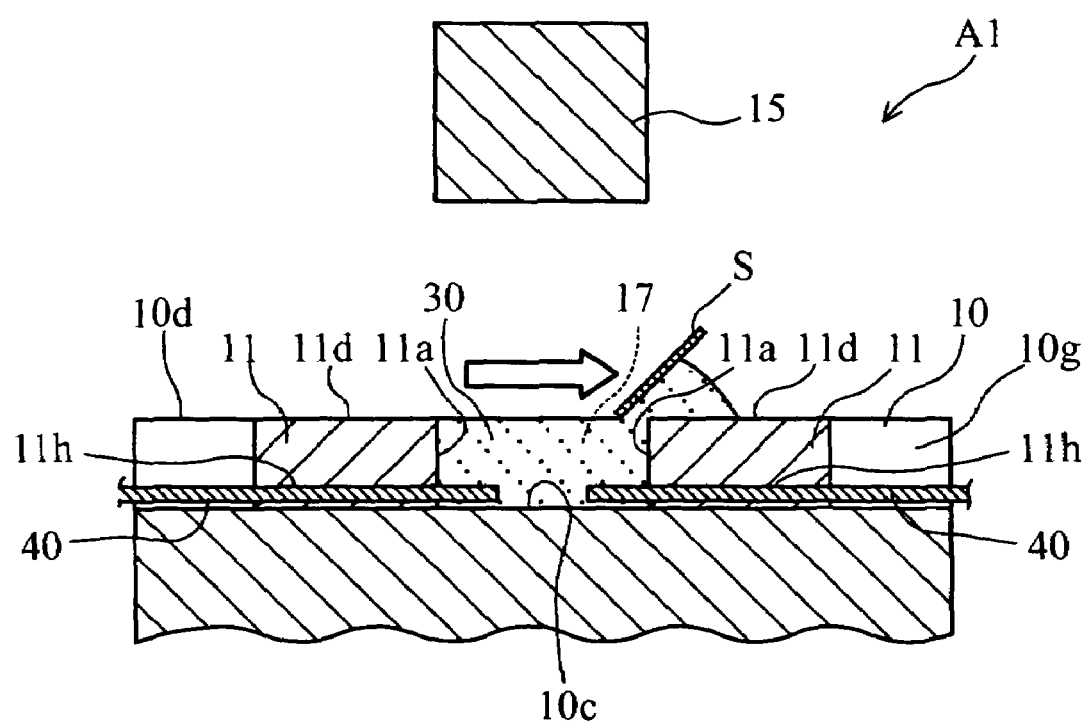
FIG. 4 is a sectional view showing the process step for removing an excess of the loaded metal powder.

Subsequently, as shown in FIG. 3, valve metal powder 30 is loaded into the cavity 17. Similarly to the wires 40, the valve metal used herein is a metal material utilizing niobium or tantalum, for example. By loading the powder 30 into the cavity 17, the projecting portions of the wires 40 are covered with the powder 30. Specifically, in the loading, the powder 30 is supplied by such an amount that the loaded powder 30 bulges beyond the upper surfaces 11d of the movable blocks 11 (and the upper surface 10d of the stationary block 10). As shown in FIG. 4, the bulged portion of the powder 30 is removed using a squeegee S. By this operation, the predetermined amount of powder 30 can be constantly loaded into the cavity 17.

Figure 5:
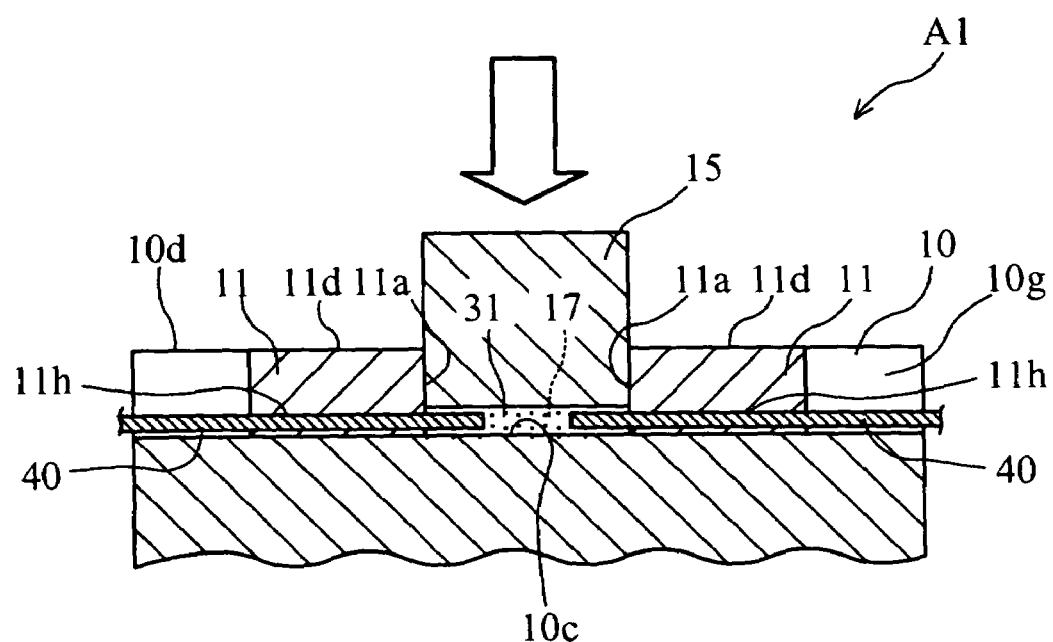
FIG. 5 is a sectional view showing the process step for forming a porous body by compacting the loaded metal powder.

Subsequently, as shown in FIG. 5, the powder 30 is compacted in the vertical direction. Specifically, a pressing block 15 arranged above the cavity 17 is lowered toward the cavity 17. The pressing block 15 is sized to fit into the cavity 17. As moving downward, the pressing block 15 enters the cavity 17 to compact the powder 30 with a predetermined compressive force. As a result, the powder 30 is formed into a flat rectangular porous body 31.

In the process step shown in FIG. 5, only the pressing block 15 is moved, and the paired movable blocks 11 are kept stationary relative to the stationary block 10. Thus, the powder 30 is compacted only vertically. As noted above, the porous body 31 is formed into a flat rectangular configuration and has a thickness (dimension in the vertical direction) which is smaller than the width (dimension in the horizontal direction). Therefore, the compression distance for the powder 30 is shorter than that in the conventional method (in which the loaded metal powder is compacted from four sides), so that the entirety of the powder 30 uniformly receives the compressive force. As a result, the powder density in the resulting porous body 31 is made uniform (or substantially uniform) throughout the body. Therefore, the porous body 31 is not warped or broken when the porous body 31 is sintered.

According to the process step shown in FIG. 5, the following advantages are enjoyed. During the compacting, the four side surfaces of the porous body 31 are rubbed against the side surfaces 10a, 11a of the stationary block 10 and the movable blocks 11. Therefore, the minute pores initially existing at the side surfaces tend to be clogged during the compacting. However, minute pores existing at the upper surface and the lower surface of the porous body 31 are not clogged during the compacting. This is because the upper and the lower surfaces of the porous body 31 are kept stationary relative to each other, without being rubbed against the horizontal surface 10c of the stationary block 10 or the lower surface of the pressing block 15. Since the porous body 31 is flat, the upper surface and the lower surface constitute a large part of the total surface area. Therefore, even when the minute pores at the side surfaces of the porous body 31 are clogged, aqueous solutions for forming a dielectric layer and an electrolyte layer can be properly impregnated into the porous body. Thus, it is possible to provide a solid electrolytic capacitor by using the flat porous body 31 having a thickness of 3 mm, for example, or the thickness of the porous body 31 may be made greater than 3 mm. To provide a capacitor of a higher capacitance, the thickness may be made no less than 5 mm or 10 mm. The width of the porous body 31 may be made no less than 5 mm, 10 mm or 20 mm, for example. As compared to this, the largest porous body that can be produced by the conventional method without causing clogging is about 1.5 mm×1.5 mm×1.5 mm in size, even when use is made of a metal powder of an adjusted particle size.

In the process step shown in FIG. 5, the powder 30 is loaded into the cavity 17 so as to cover the wire 40 and then compacted in the direction (vertical direction in FIG. 5) which is generally perpendicular to the axial direction of the wire 40. Therefore, as compared with the case where the powder 30 is compacted in the axial direction of the wire, the powder is more reliably bonded to the wire 40 by compaction.

Figure 6:
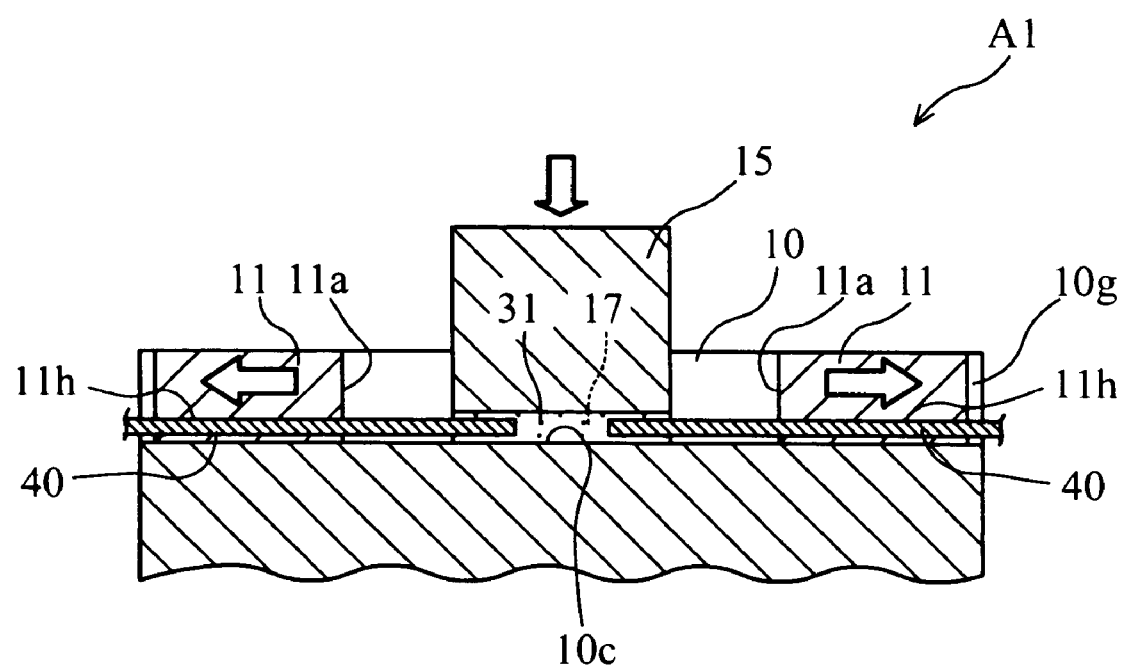
FIG. 6 is a sectional view showing the process step for retreating a movable block of the mold.

After the porous body 31 is formed by the process step shown in FIG. 5, the movable blocks 11 are retreated (i.e., the two movable blocks 11 are moved away from each other), as shown in FIG. 6. More specifically, first, the compressive force of the pressing block 15 exerted to the porous body 31 is relaxed to a certain level prior to the retreating of the movable blocks 11. Then, the movable blocks 11 are moved away from the porous body 31. At this time, the porous body 31 is still sandwiched between the pressing block 15 and the stationary block 10, and therefore unable to move. In retreating the movable blocks 11, the wire 40 is held by the above-mentioned wire feeder (not shown). Therefore, in causing the movable blocks 11 to retreat, it is possible to prevent the bond between the wire 40 and the porous body 31 from weakening or to prevent the wire from being pulled out from the porous body 31.

Figure 7:
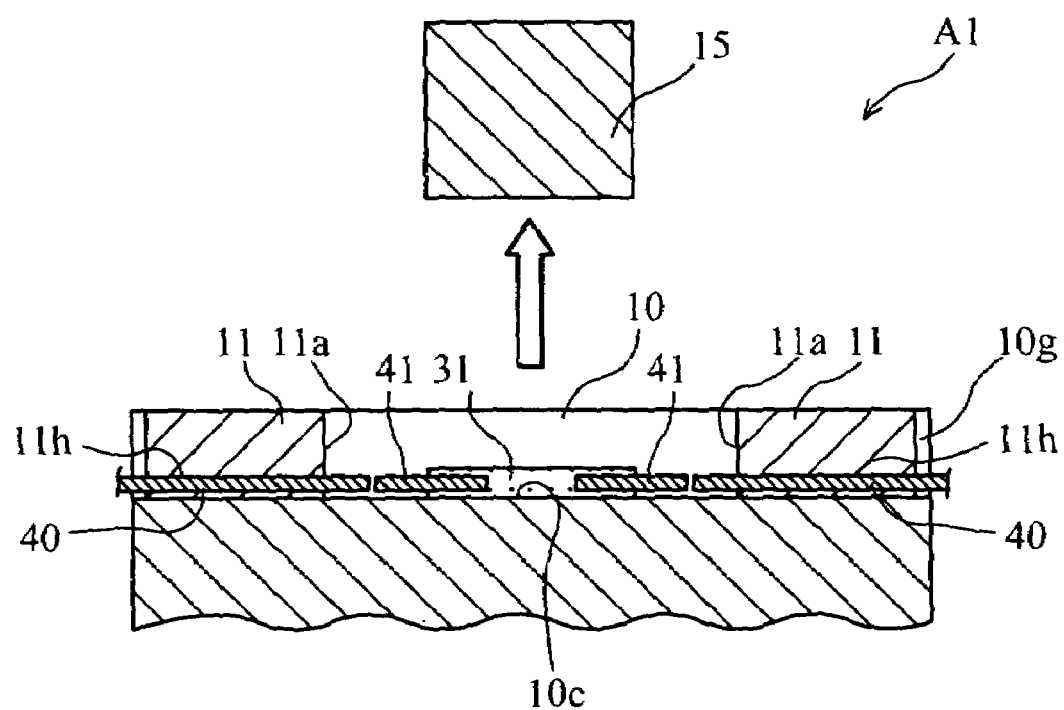
FIG. 7 is a sectional view showing the process step for cutting a wire partially embedded in the porous body.

As shown in FIG. 7, after the movable blocks 11 are retreated, each of the wires 40 is cut at a position spaced from the porous body 31 by a predetermined distance. As a result, two anodes 41 partially embedded in the porous body 31 are obtained.

Figure 8:
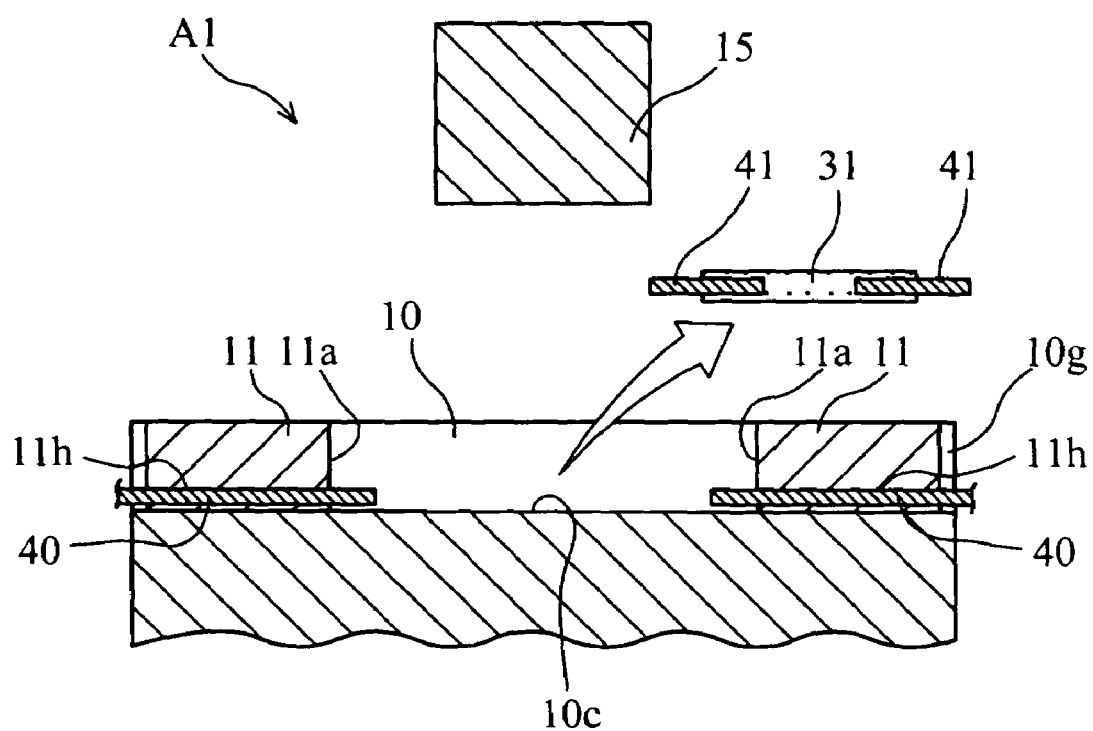
FIG. 8 is a sectional view showing the process step for taking the porous body out of the mold.

Thereafter, the pressing block 15 is retreated upward, and the porous body 31 is taken out from the mold A1, as shown in FIG. 8.

Figure 9:
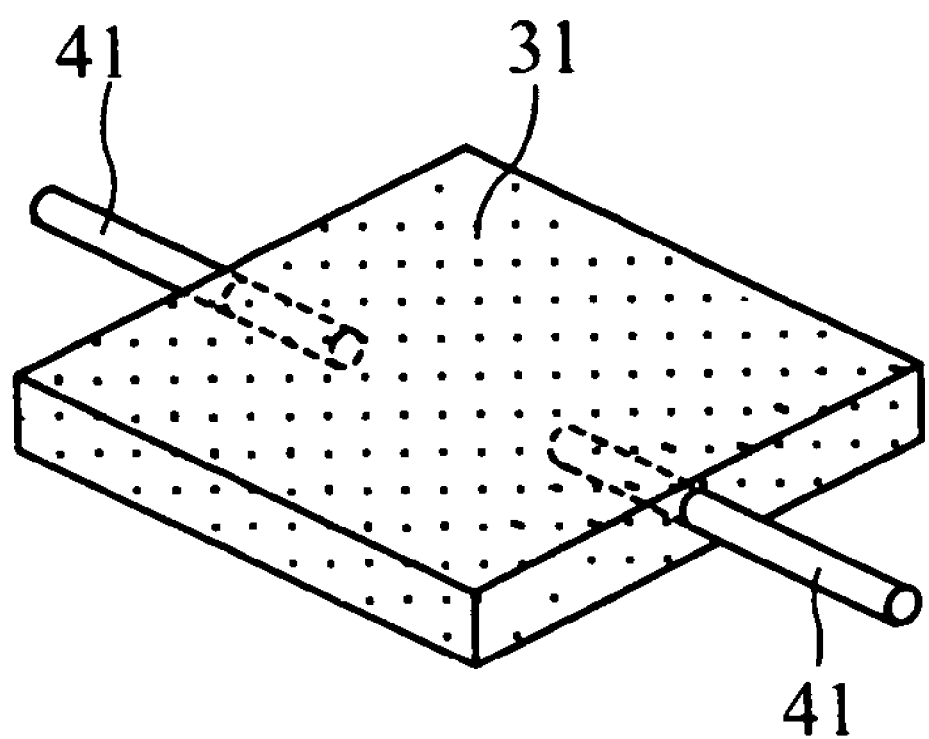
FIG. 9 is a perspective view showing an intermediate product obtained by the manufacturing method according to the first embodiment.

In this way, an intermediate product of a solid electrolytic capacitor as shown in FIG. 9 is provided. Thereafter, a heating and sintering step for turning the porous body 31 into a porous sintered body and a chemical treatment step for forming a dielectric layer and an electrolyte layer in the porous sintered body are performed, to produce a solid electrolytic capacitor. The capacitor obtained in this way is connected to an electrical circuit so that a current flows from one to the other one of the anodes 41, which provides noise cancellation effect over a wide frequency range. Further, the capacitor can supply a large power with high responsiveness to high frequency.

In the above embodiment, only the pressing block 15 is moved for compaction of the powder 30. Therefore, as compared with the prior art method in which four pressing blocks are moved, the number of movable parts of the manufacturing apparatus is small, and hence, the manufacturing apparatus can be simple in structure.

Figure 10:
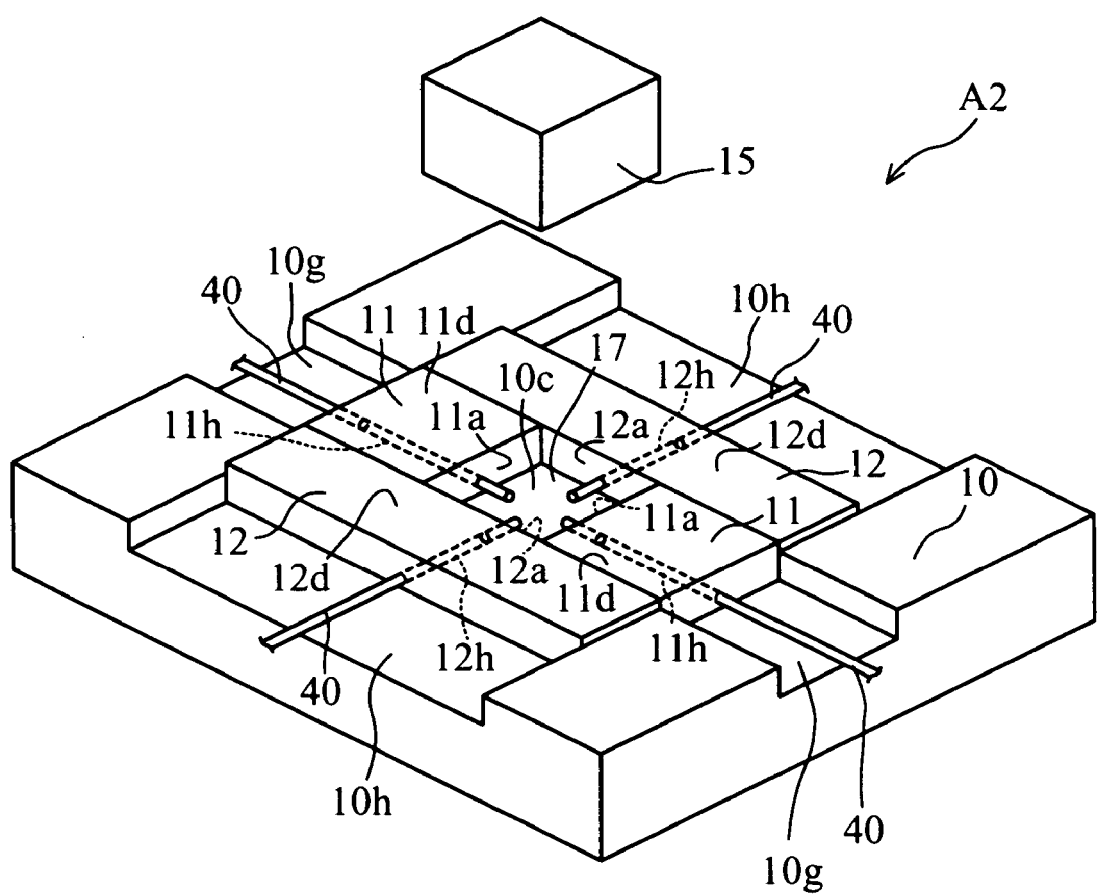
FIG. 10 is a perspective view showing a mold used in the manufacturing method according to a second embodiment of the present invention.
Figure 11:
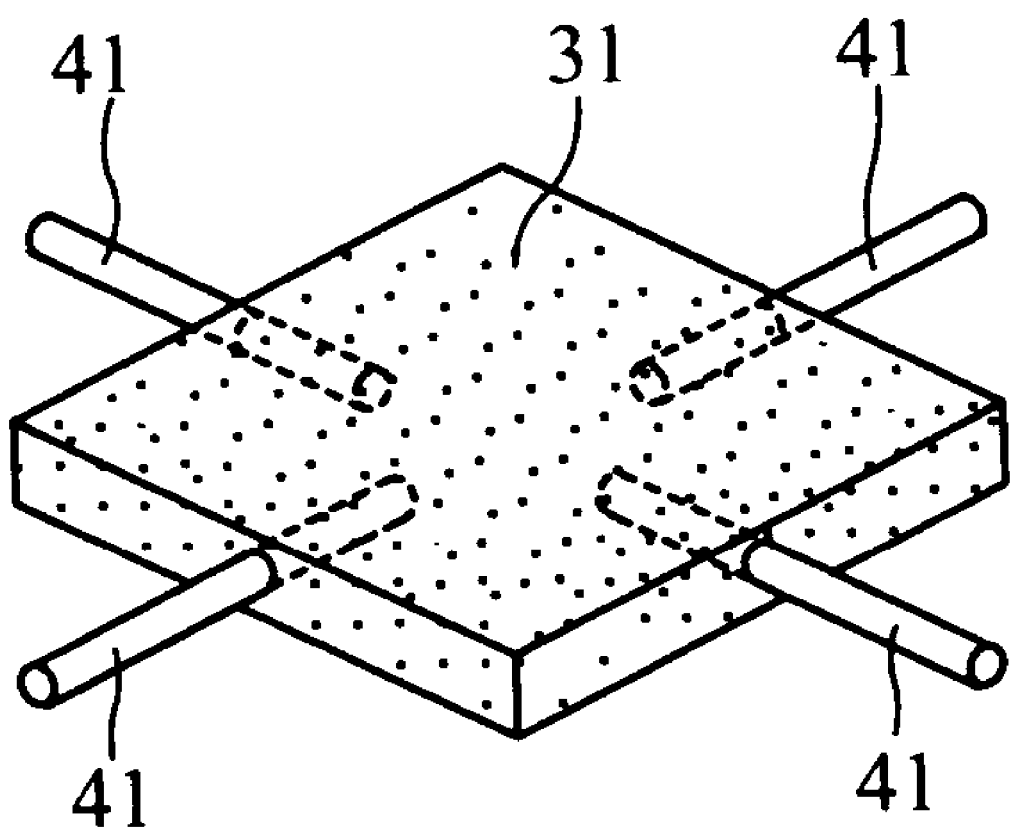
FIG. 11 is a perspective view showing an intermediate product obtained by the manufacturing method according to the second embodiment.
Figure 12:
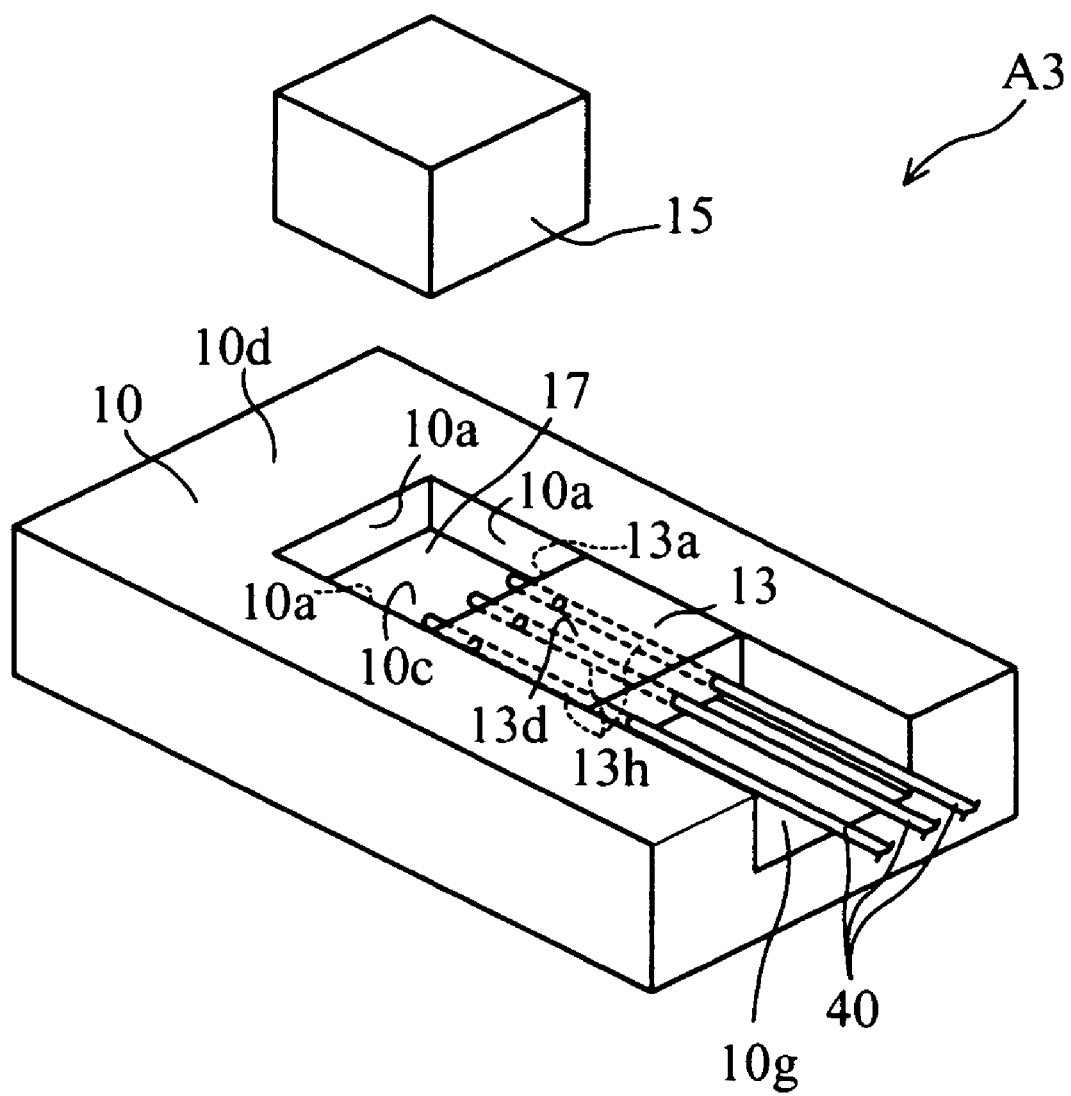
FIG. 12 is a perspective view showing a mold used in the manufacturing method according to a third embodiment of the present invention.

FIGS. 10–16 illustrate a solid electrolytic capacitor fabrication method according to a second embodiment of the present invention. In this embodiment, an intermediate product which includes four anodes 41 and a porous body 31 as shown in FIG. 11 is manufactured.

Specifically, a mold A2 as shown in FIG. 10 is used which includes a stationary block 10, a pair of movable blocks (first movable blocks) 11 and another pair of movable blocks (second movable blocks) 12. The stationary block 10 is formed with a first groove 10g and a second groove 10h. The first movable blocks 11 are movably fitted in the first groove 10g, whereas the second movable blocks 12 are movably fitted in the second groove 10h. A cavity 17 is defined by inner side surfaces 11a of the first movable blocks 11, inner side surfaces 12a of the second movable block 12, and an upward-facing horizontal surface 10c of the stationary block 10. To form the cavity, the first movable blocks 11 may be held at predetermined positions, and then the second movable blocks 12 are brought into contact with the first blocks 11 to be fixed at that positions.

As shown in FIG. 10, each of the movable blocks 11, 12 is formed with a through-hole 11h or 12h for inserting a wire 40. The wire 40 is fed into the through-hole so as to project from the side surface 11a or 11b of the movable block into the cavity 17, and fixed when a predetermined projecting amount is attained. These operations are performed by a non-illustrated wire feeder.

Thereafter, the loading of valve metal powder and the compacting by the pressing block 15 are performed similarly to the first embodiment. Then, the retreating of the movable blocks 11, 12, the cutting of the wires 40, and the retreating of the pressing block 15 are subsequently performed to provide an intermediate product shown in FIG. 11. The intermediate product includes a flat rectangular porous body 31 and four anodes 41 projecting horizontally from the four side surfaces of the porous body. In a solid electrolytic capacitor made by utilizing such an intermediate product, current can flow dispersedly through the plural anodes 41, whereby a low resistance and a low impedance are realized.

Figure 13:
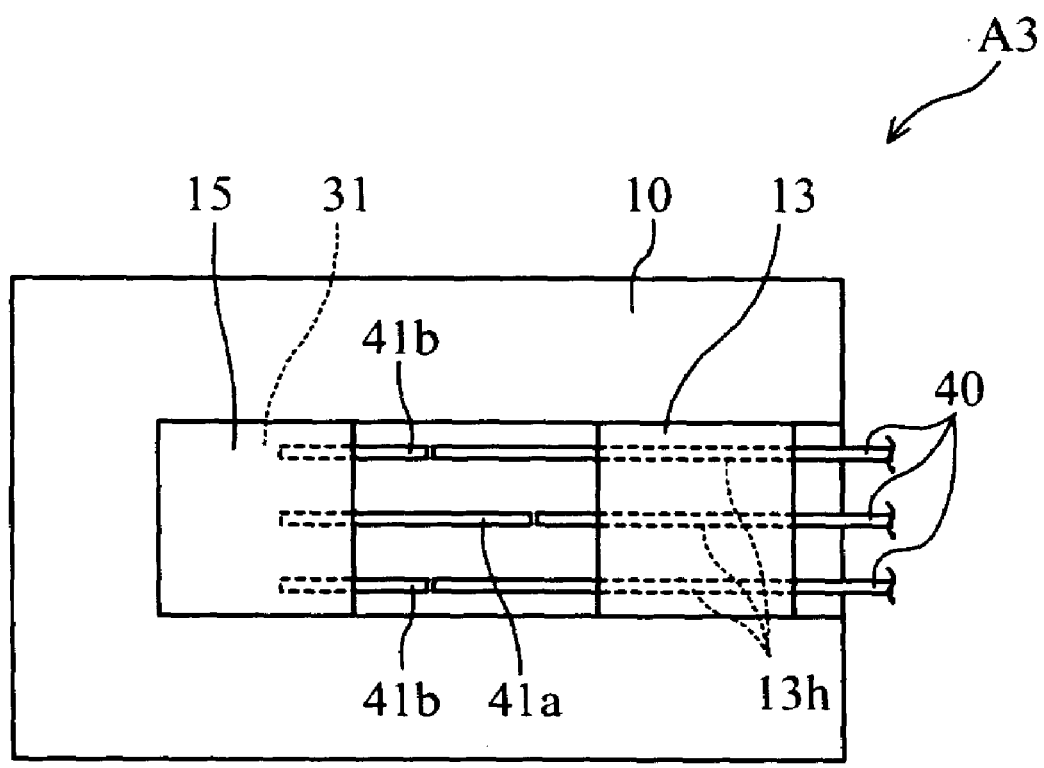
FIG. 13 is a plan view showing the wire cutting process in the manufacturing method according to the third embodiment.
Figure 14A:
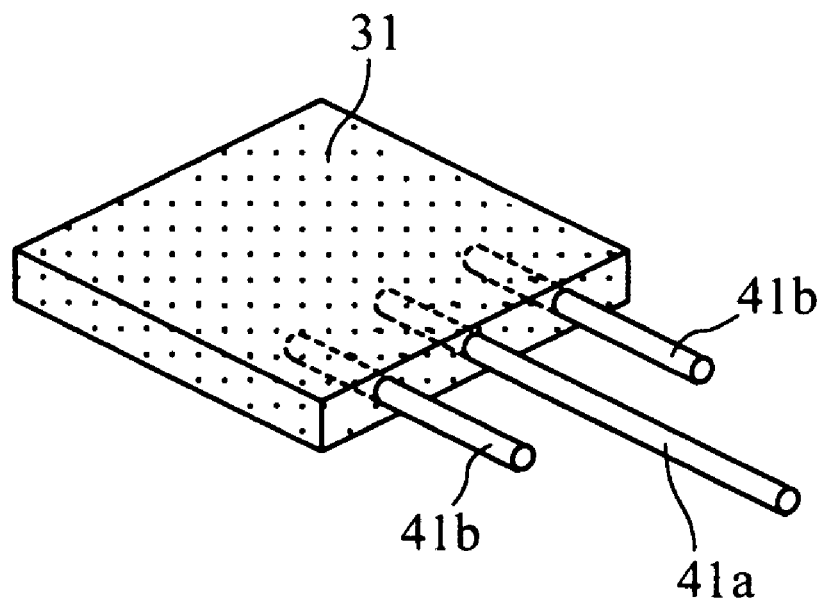
FIG. 14A is a perspective view showing an intermediate product obtained by the manufacturing method according to the third embodiment.

FIGS. 12–14A illustrate a solid electrolytic capacitor fabrication method according to a third embodiment of the present invention. In this embodiment, an intermediate product as shown in FIG. 14A is manufactured, which includes a porous body 31 and three anodes projecting from one side surface of the porous body.

In the manufacturing method of the third embodiment, a mold A3 is used which includes a stationary block 10 and a movable block 13. The stationary block 10 is formed with a groove 10g, in which the movable block 13 is movably fitted. A cavity 17 is defined by an inner side surface 13a of the movable block 13, and three inner side surfaces 10a and an upward-facing horizontal surface 10c of the stationary block 10. The movable block 13 is formed with three through-holes 13h into which three wires 40 are inserted. Each of the wires 40 is arranged so as to project into the cavity 17 by a predetermined amount.

Then, valve metal powder is loaded into the cavity 17 to be compacted into a porous body 31. As shown in FIG. 13, after the porous body 31 is formed, the movable block 13 is retreated to a predetermined position with the porous body 31 held by the pressing block 15 and the stationary block 10. Subsequently, the three wires 40 are cut at predetermined positions. In this embodiment, the center anode 41a is cut at a position which is farther from the porous body 31 than the cutting positions of the other two wires 40. Thus, the center anode 41a is longer than the other two anodes 41b. With such an arrangement, the intermediate product can be transported by holding the center anode 41a alone (i.e., without touching the porous body 31). In this manner, it is possible to avoid the clogging of the minute pores formed at the surfaces of the porous body 31 and avoid the deformation or breakage of the porous body 31. By making the two anodes 41b relatively short, the amount of the wires 40 to be used is saved, which is advantageous for cost reduction. The anode 41a may be cut into the same length as that of the other two anodes 41b at a stage in which the possibility of the breakage of the porous body 31 is eliminated. For example, such cutting is performed after the porous body 31 is covered by a resin package.

Figure 14B:
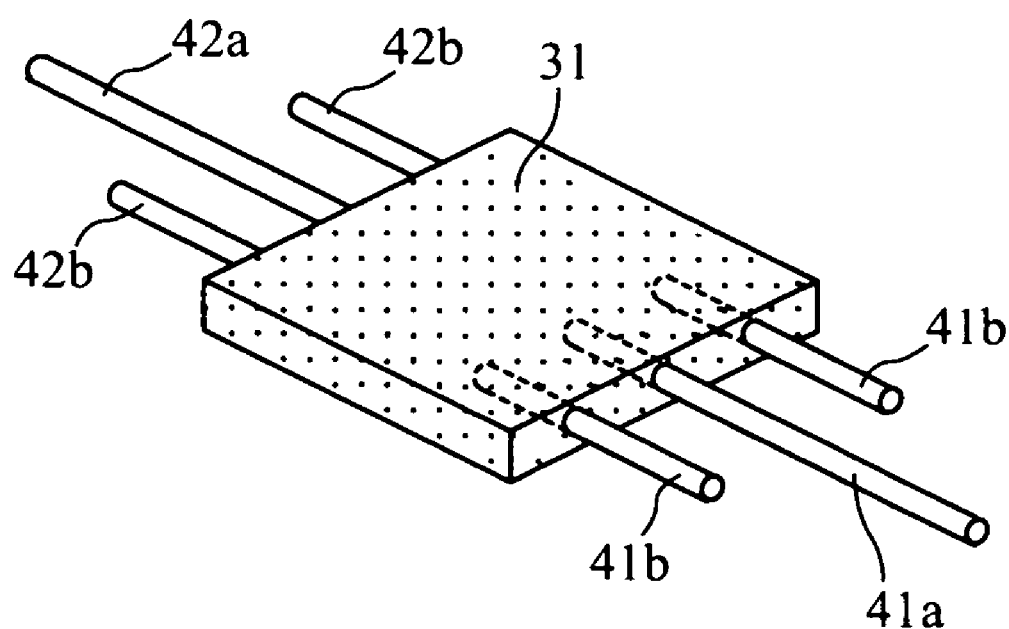
FIG. 14B is a perspective view of a variation of the intermediate product shown in FIG. 14A.

The present invention is not limited to the above-described structure. For example, two of the three anodes may be made longer than the remaining one. Further, the number of anodes projecting from a side surface of the porous body 31 is not limited to three but may be two, four or more. As shown in FIG. 14B, a plurality of anodes 42a, 42b may be additionally arranged to project from another side surface of the porous body 31.

Figure 15:
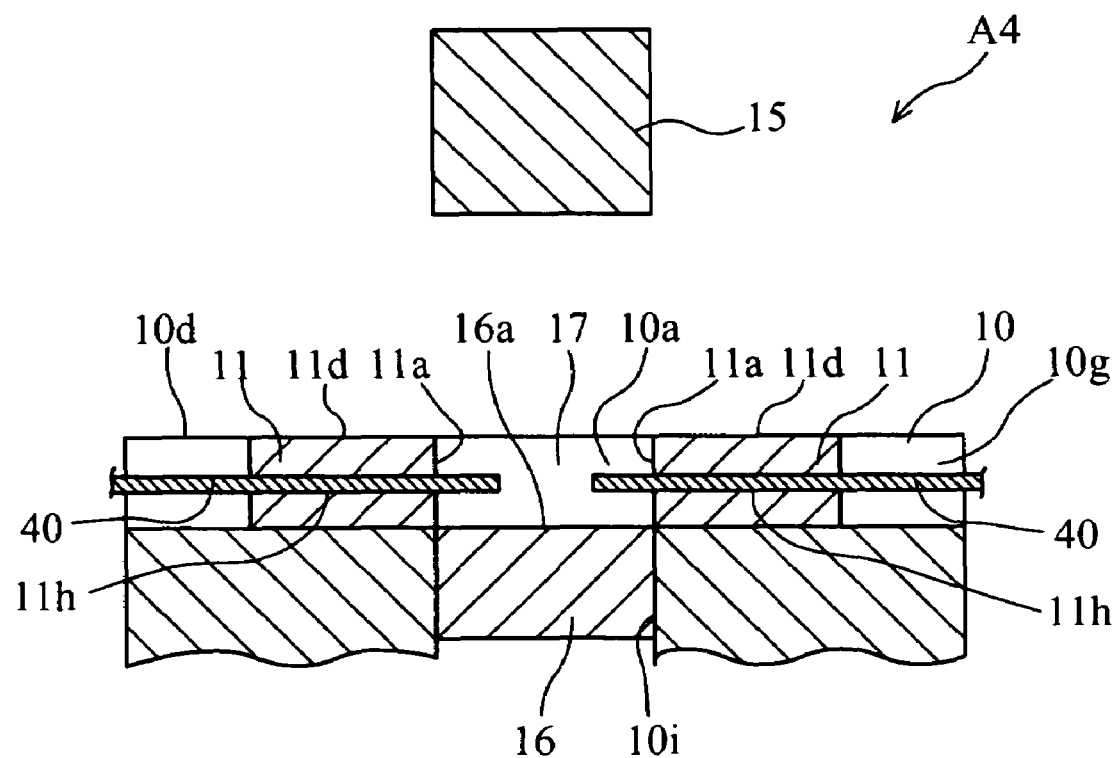
FIG. 15 is a sectional view showing a mold used in the manufacturing method according to a fourth embodiment of the present invention.
Figure 16:
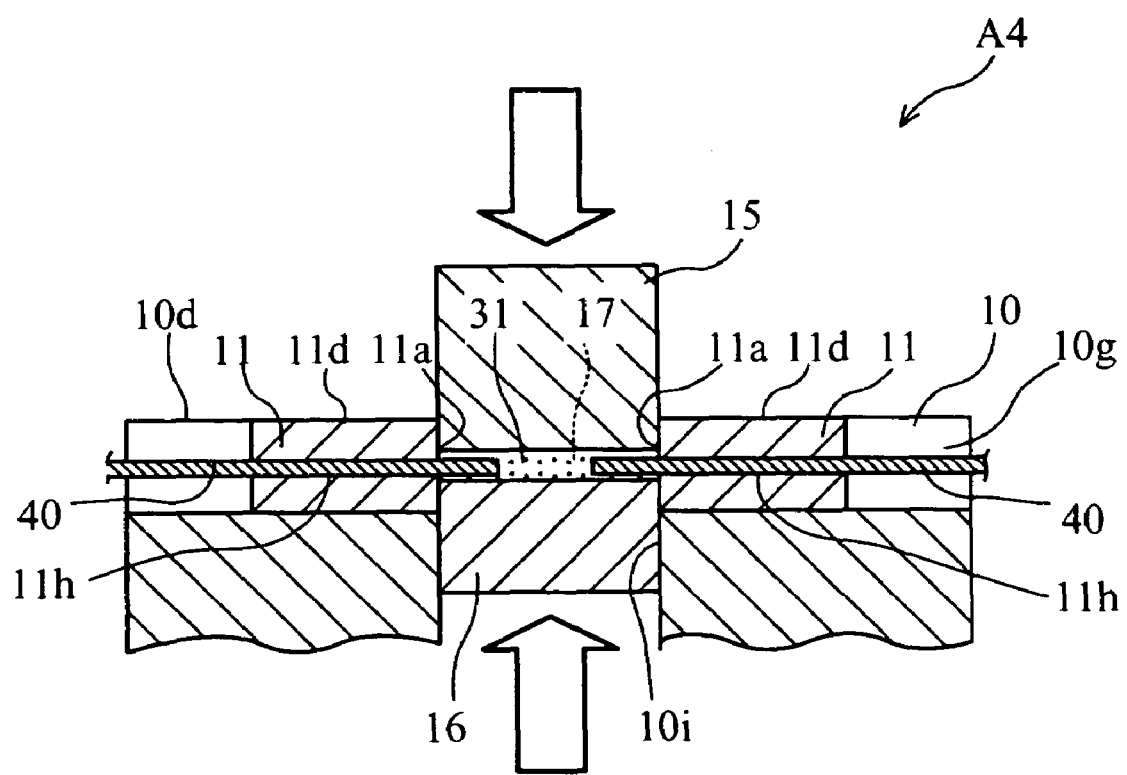
FIG. 16 is a sectional view showing the metal powder compacting step in the manufacturing method according to the fourth embodiment.

FIGS. 15 and 16 illustrate a solid electrolytic capacitor fabrication method according to a fourth embodiment of the present invention. The manufacturing method of the fourth embodiment is basically the same as that of the first embodiment except that the compacting of valve metal powder is performed by using two pressing blocks in the fourth embodiment.

Specifically, in the manufacturing method of the fourth embodiment, a mold A4 is used which includes a stationary block 10, two movable blocks 11 which are movable horizontally, and two pressing blocks 15, 16 which are movable vertically. The stationary block 10 is formed with a groove 10g, in which each of the movable blocks 11 is movably fitted. The stationary block 10 is further formed with a hole 10i, in which the pressing block 16 is movably fitted. The other pressing block 15 is arranged above the pressing block 15. The size of the pressing blocks 15 and 16, as viewed in plan, is made equal to that of the porous body to be formed.

The stationary block 10 includes two inner side surfaces 10a facing each other, and each movable block 11 includes an inner side surface 11a. The pressing block 16 includes an upper surface 16a. The side surfaces 10a, 11a and the upper surface 16a define a cavity 17. In defining the cavity, as shown in FIG. 15, the pressing block 16 is arranged so that the upper surface 16a of the pressing block 16 becomes flush with the bottom surface of the groove 10g of the stationary block 10. Each of the movable blocks 11 is formed with at least one through-hole 11h extending horizontally. Each of the through-holes 11h is positioned at the center of the movable blocks 11 in the thickness direction (vertical direction in FIG. 15). In each of the through-holes 11, a wire 40 is inserted so as to project from the side surface 11a into the cavity 17 by a predetermined amount.

After valve metal powder is loaded into the cavity 17, the powder is compacted by the pressing blocks 15 and 16, as shown in FIG. 16. Specifically, each of the pressing blocks 15 and 16 is moved toward the center of the cavity 17 to exert a predetermined compressive force. As a result, the valve metal powder is compacted to form a porous body 31. In this process step, each of the wires 40 is duly bonded to the center portion of the porous body 31 in the thickness direction.

By the above method, an intermediate product which is similar to that shown in FIG. 9 is obtained. With this method which utilizes two upper and lower pressing blocks, the travel distance (compression distance) of each pressing block can be reduced as compared with the case where a single pressing block is used. Accordingly, the travel distance of the metal powder as the object to be compacted can also be reduced, whereby the variation of powder density in the compacted body can be reduced. Therefore, in heating and sintering the porous body 31, the porous body is less likely to be warped or broken.

Figure 20:
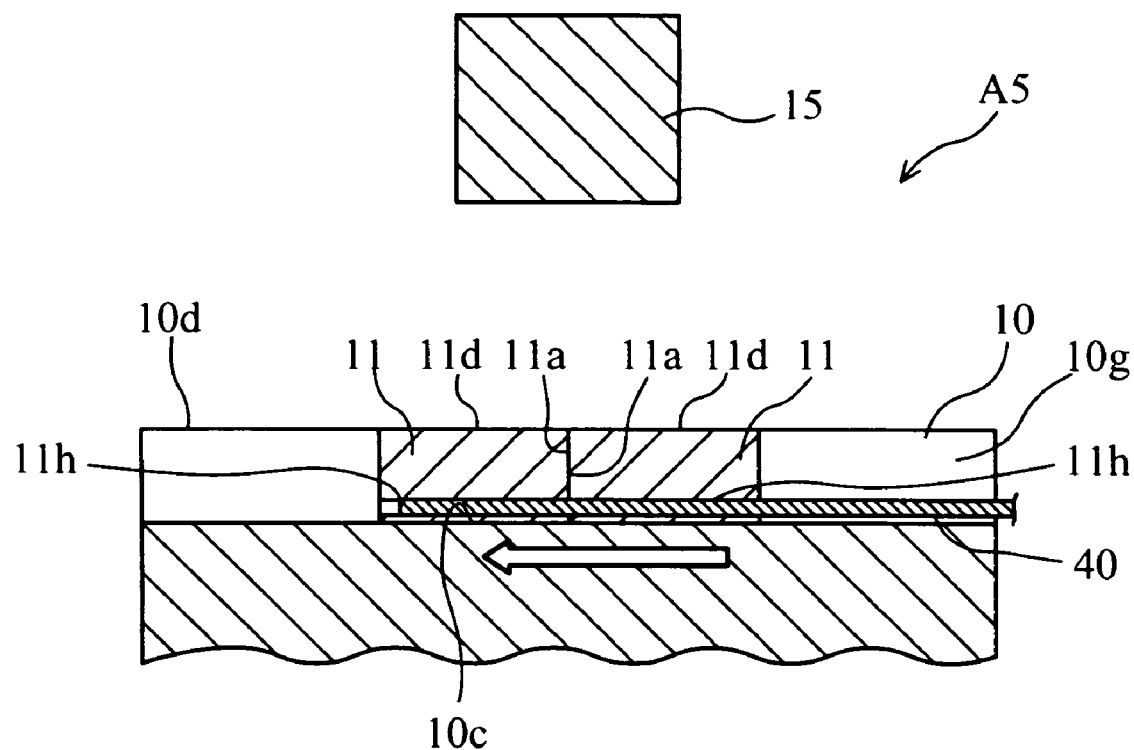
FIG. 20 is a sectional view showing the state in which a wire is inserted into the two movable blocks.
Figure 21:
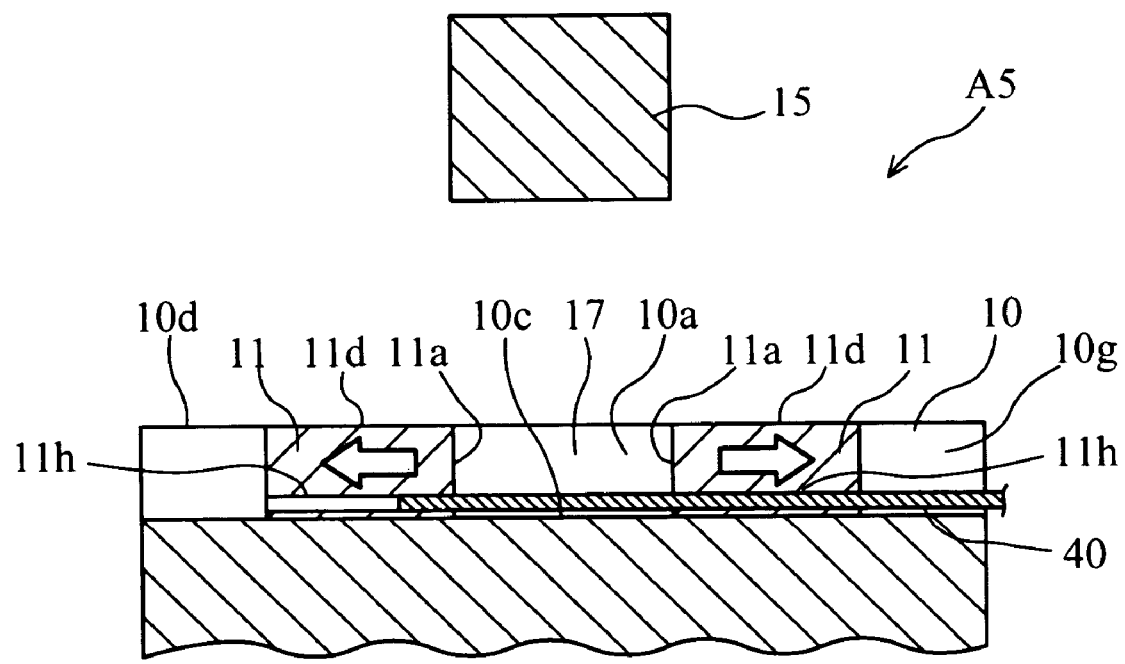
FIG. 21 is a sectional view showing the state in which the two movable block are separated from each other.
Figure 22A:
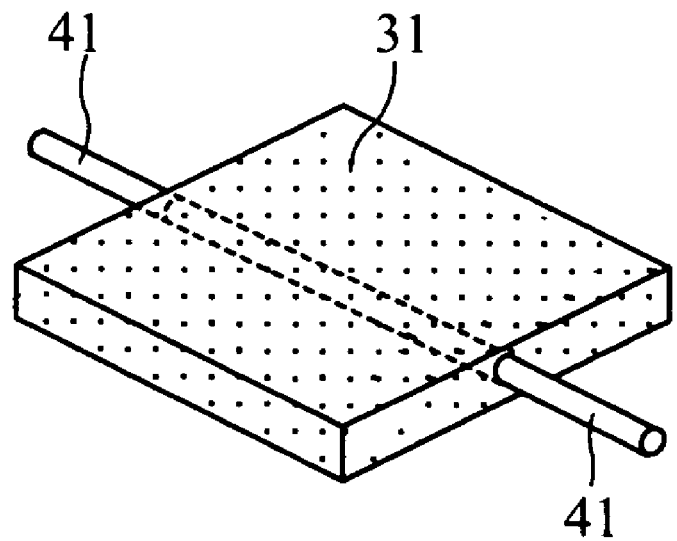
FIG. 22A is a perspective view showing an intermediate product obtained by the manufacturing method according to the fifth embodiment.

FIGS. 17–22A illustrate a solid electrolytic capacitor fabrication method according to a fifth embodiment of the present invention. By the manufacturing method of the fifth embodiment, an intermediate product as shown in FIG. 22A is manufactured. The intermediate product includes a porous body 31, and a single anode 41 penetrating horizontally through the porous body.

Figure 17:
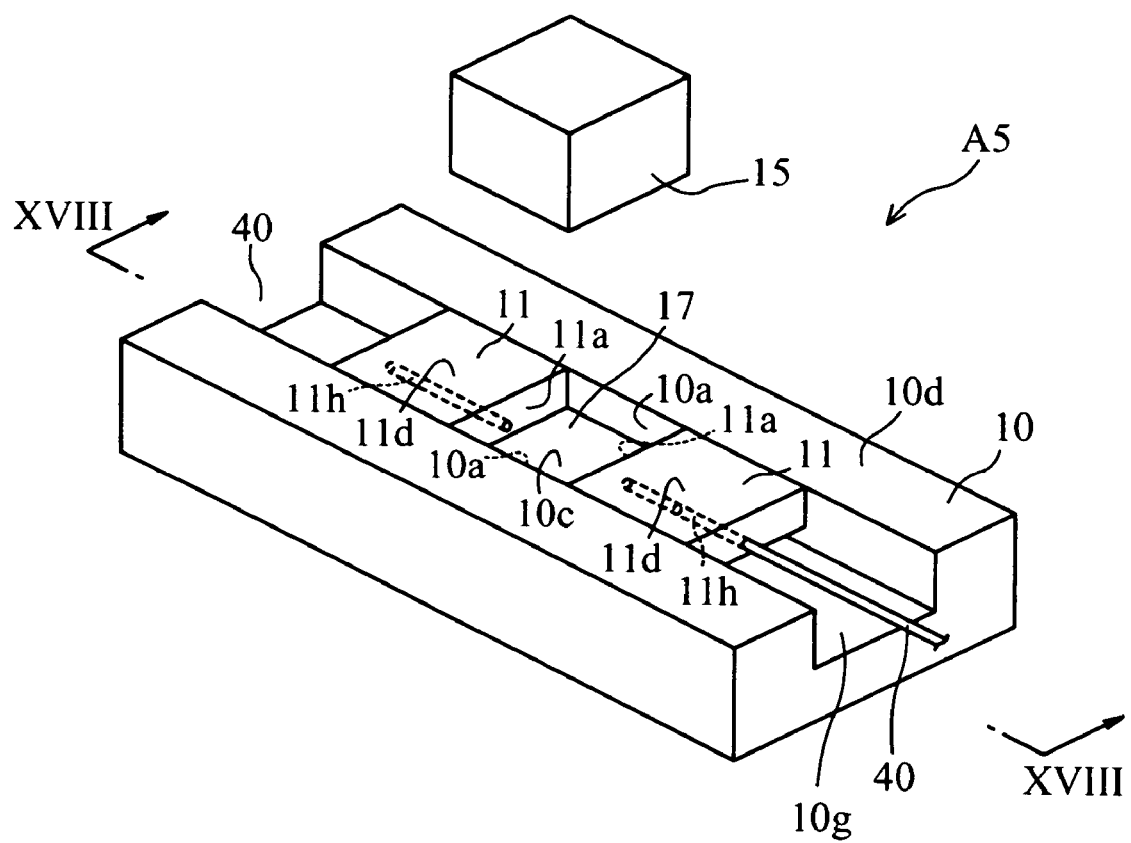
FIG. 17 is a perspective view showing a mold used in the manufacturing method according to a fifth embodiment of the present invention.

In the manufacturing method of the fifth embodiment, a mold A5 as shown in FIG. 17 is used, which includes a stationary block 10 and a pair of movable blocks 11. The stationary block 10 is formed with a groove 10g in which the movable blocks 11 are movably fitted. Each of the movable blocks 11 is formed with a horizontally extending through-hole 11h.

Figure 18:
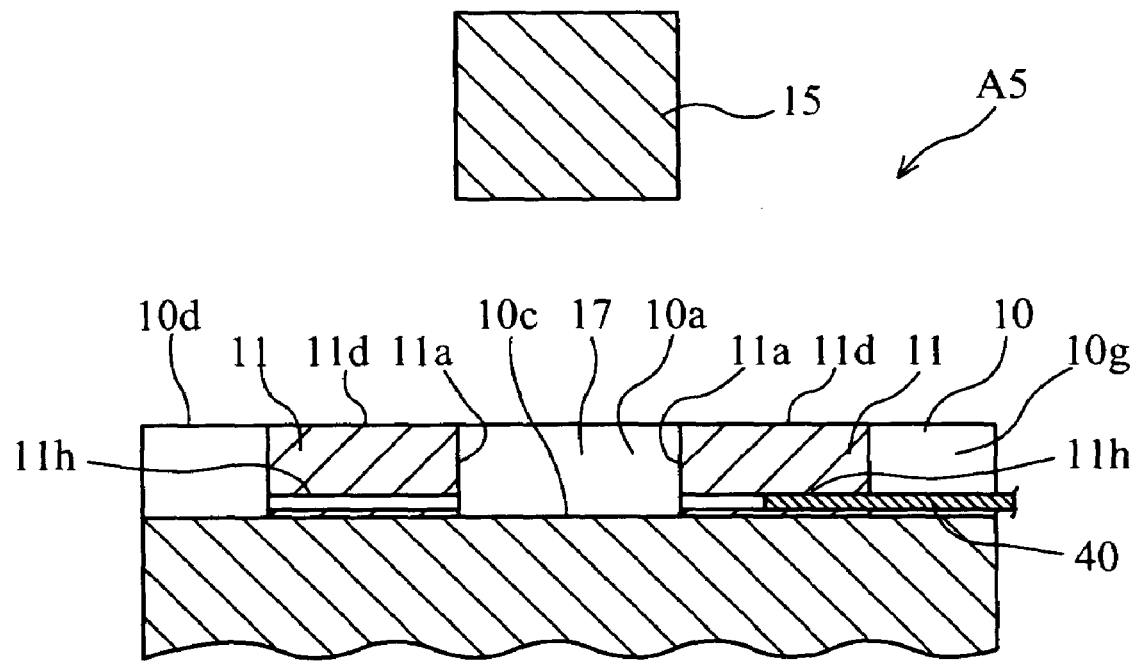
FIG. 18 is a sectional view taken along lines XVIII—XVIII in FIG. 17.
Figure 19:
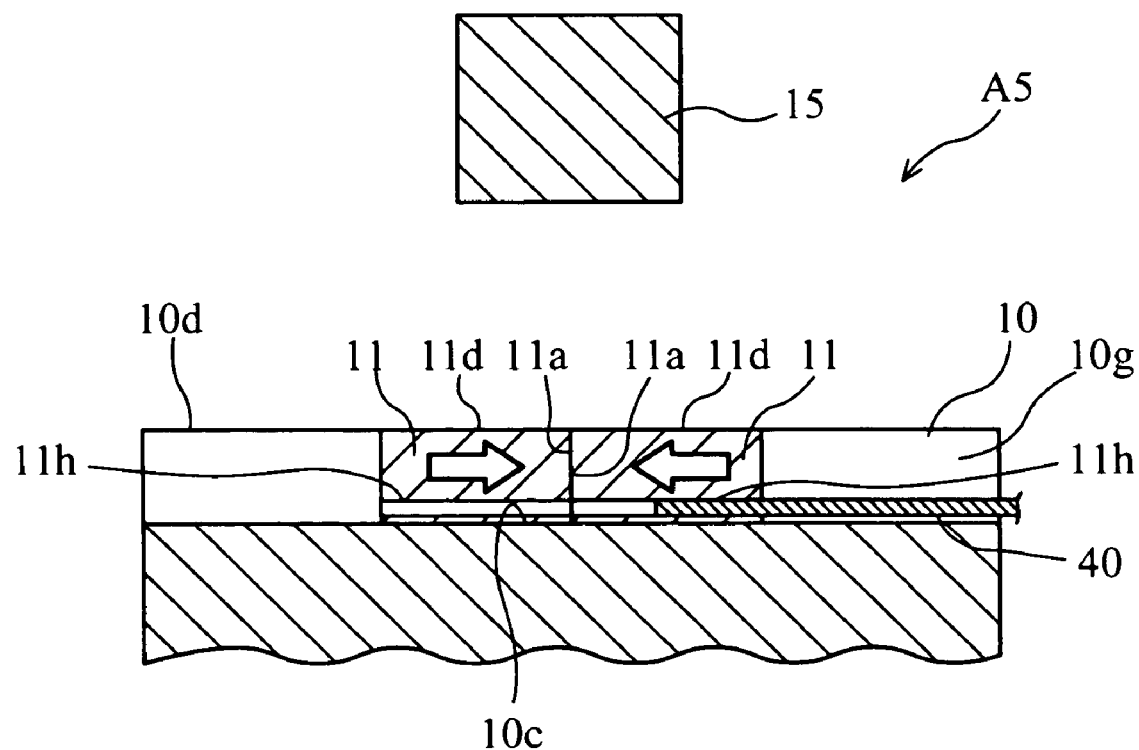
FIG. 19 is a sectional view showing the state in which two movable blocks are brought into contact with each other.

In this method, first, as shown in FIG. 18, a wire 40 is partially inserted into the through-hole 11h of one of the two movable blocks 11. Then, as shown in FIG. 19, the two blocks 11 are moved to approach each other to bring respective side surfaces 11a into contact with each other. By this operation, the through-holes 11 provided in the respective movable blocks 11 are temporarily connected to each other to form a single hole. Thereafter, as shown in FIG. 20, the wire 40 is caused to project from the one through-hole 11h (the right through-hole 11h in FIG. 20) to enter the other (left) through-hole 11h by a predetermined amount. With such a method, the wire 40 can be smoothly inserted from the right through-hole 11h into the left through-hole 11h, whereby the wire 40 is prevented from bending. However, the present invention is not limited to this, and when the wire 40 has a sufficient rigidity, the wire 40 may be inserted into the two through-holes 11h with the two movable blocks 11 spaced from each other by a predetermined distance.

Subsequently, as shown in FIG. 21, the movable blocks 11 are moved to be away from each other until the distance between the blocks corresponds to a predetermined dimension (which is set for the subsequent pressurizing step). At this time, the wire 40 is fixedly held by the wire feeder (not shown). Therefore, the wire 40 penetrates through the cavity 17.

Thereafter, loading of valve metal powder into the cavity 17, compacting of the valve metal powder, and cutting of the wire 40 are performed to provide an intermediate product as shown in FIG. 22. By using the intermediate product, an intended solid electrolytic capacitor is manufactured. As will be easily understood, a wire which has been cut, in advance, into a predetermined length may be used in the above method. In such a case, the wire is so arranged as to penetrate through the cavity 17 (See FIG. 21) and then compacting of the metal powder is performed. In this case, a predetermined recess may be formed in the movable block, and the wire having a predetermined length is arranged in the recess to extend into the cavity 17.

Generally, a porous sintered body tends to have a relatively large electrical resistance, because the current path in the porous sintered body is made by linkage of minute particles of metal powder. More specifically, the current path of metal powder has a small sectional area and a long length, since it extends in the sintered body, avoiding a large number of minute pores formed therein. Accordingly, the current path, and hence the porous body, has a great resistance.

However, in the capacitor made by using the intermediate product shown in FIG. 22A, the circuit current flows from one end to the other end of the anode 41. As compared with the porous sintered body, the anode 41, being solid, has a relatively low electrical resistance and impedance. Therefore, the capacitor is advantageously prevented from burning and capable of supplying a large power with high responsiveness to high frequency.

Figure 22B:
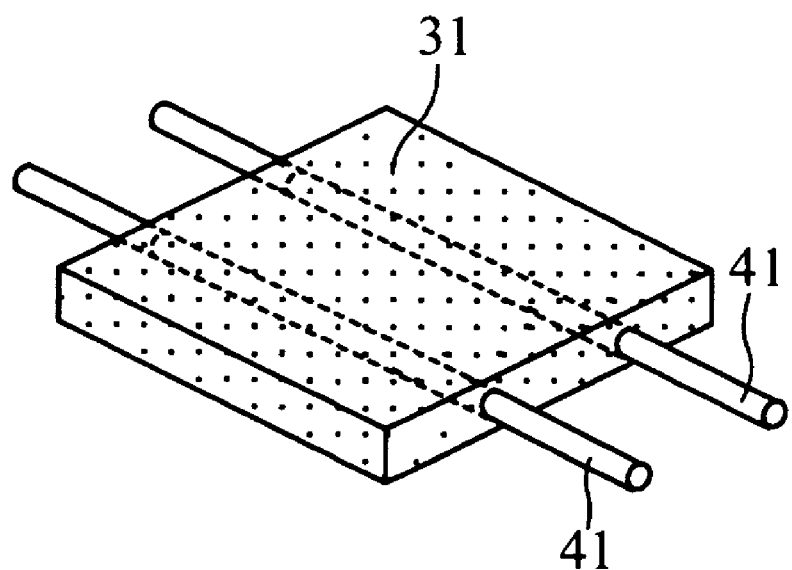
FIG. 22B is a perspective view of a variation of the intermediate product shown in FIG. 22A.
Figure 23:
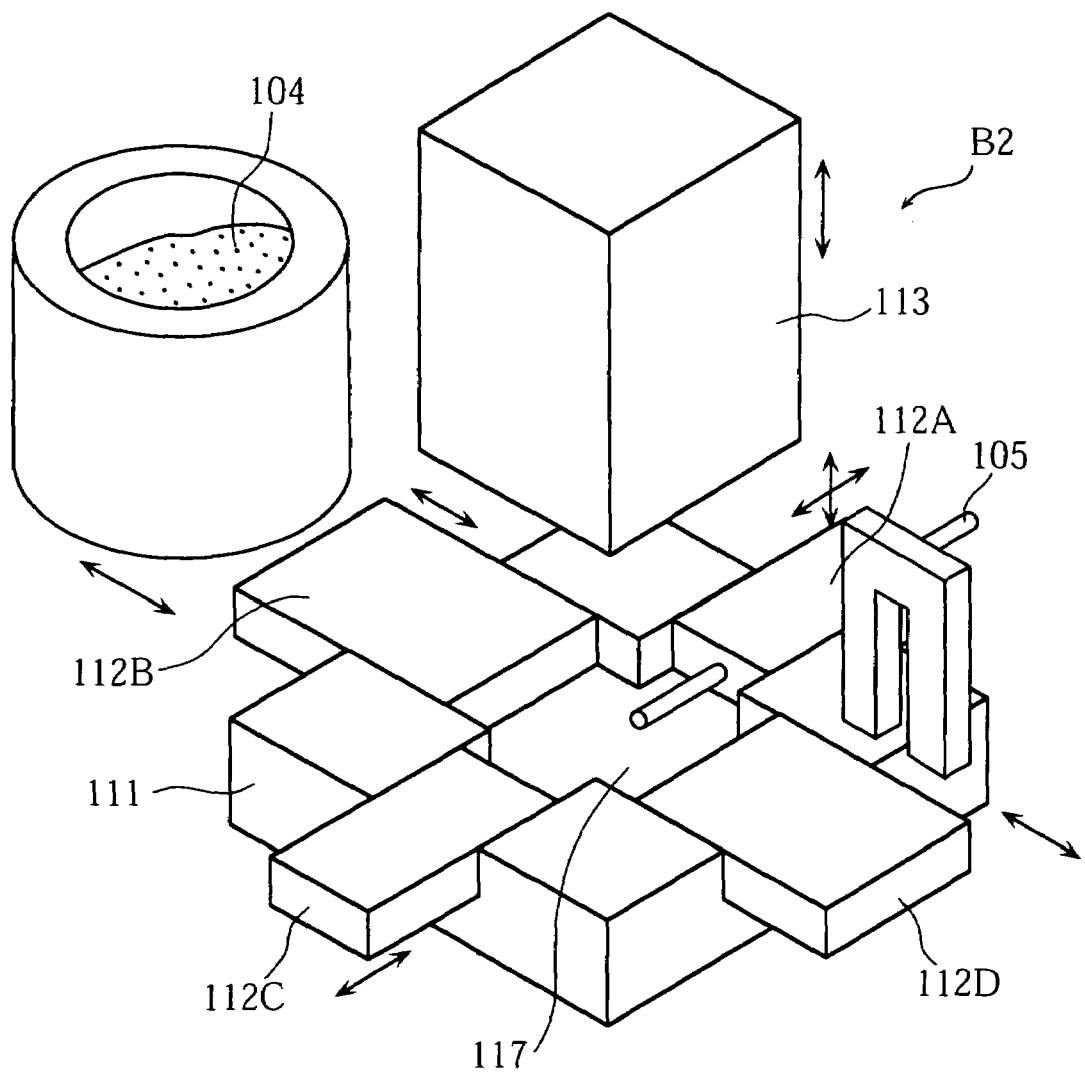
FIG. 23 is a perspective view showing a prior art mold.
Figure 24:
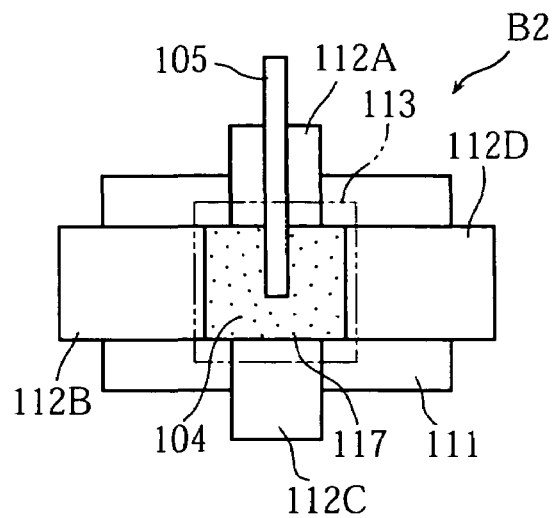
FIG. 24 is a plan view showing the state of metal powder loaded in a cavity defined by the mold shown in FIG. 23.
Figure 25:
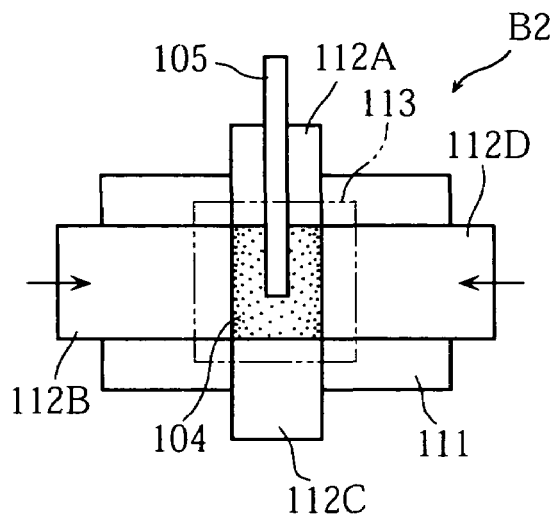
FIG. 25 is a plan view showing the first compacting step for the metal powder shown in FIG. 24.
Figure 26:
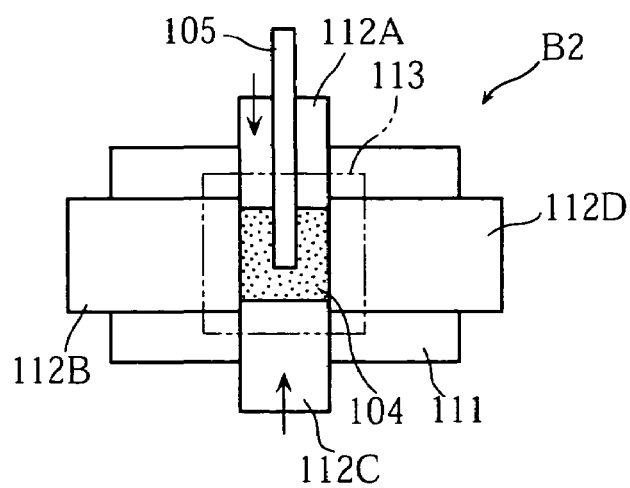
FIG. 26 is a plan view showing the second compacting step for the metal powder.

In the present invention, as shown in FIG. 22B, a plurality of anodes 41 may be provided to penetrate through the porous sintered body 31. In such a case, in the mold A5 shown in FIG. 17, each of the movable blocks 11 is formed with a plurality of through-holes 11h. The intermediate product shown in FIG. 22B can be made by performing the process steps which are similar to those shown in FIGS. 18–21 by using such a mold. In the solid electrolytic capacitor incorporating the intermediate product, current flows dispersedly through the plurality of anodes 41. Therefore, as compared with the structure which includes a single anode, the resistance and impedance of the capacitor is reduced.

In the present invention, the method for providing an anode in a porous body is not limited to disposing a metal wire in a cavity before compacting metal powder. For example, after a porous body is made, a wire having a predetermined length may be welded or bonded to the porous body or the porous sintered body.

The solid electrolytic capacitor made by the manufacturing method of the present invention can be used not only for the noise cancellation of a device such as a CPU but also for smoothing output of a DC-DC converter or the ripple removal in a bypass circuit, for example.

The present invention being thus described, it is apparent that the same may be varied in many ways. Such variations should not be regarded as a departure from the spirit and scope of the present invention, and all such modifications as would be obvious to those skilled in the art are intended to be included within the scope of the following claims.

The invention claimed is:

1. A method for making a solid electrolytic capacitor comprising the steps of:
    first, loading valve metal powder into a cavity defined by a horizontal surface and vertical side surfaces provided in a mold;
    second, arranging a wire made of valve metal to project horizontally from a side surface of a movable block defining part of the cavity;
    third, compacting the powder loaded in the cavity, forming a flat porous body; and
    fourth, moving the movable block away from the flat porous body;
    wherein the compacting of the powder is performed by applying a compressive force only perpendicularly to the wire to form the flat porous body having a predetermined thickness in a vertical direction.

2. The method according to claim 1, wherein the compacting of the powder is performed by lowering a pressing block from above the cavity toward the cavity with the horizontal surface fixed in position.

3. The method according to claim 1, wherein the compacting of the powder is performed by lowering a first pressing block from above the cavity toward the cavity and by simultaneously raising a second pressing block providing the horizontal surface toward the cavity.

4. The method according to claim 1, wherein the movable block is horizontally movable.

5. The method according to claim 1, wherein in the step of moving the movable block away from the flat porous body, the flat porous body is held by the mold with a compressive force which is smaller than a compressive force exerted for compacting the powder.

6. The method according to claim 1, further comprising the step of cutting the wire at a position spaced from the flat porous body after the movable block is moved away from the flat porous body.

7. The method according to claim 1, wherein in the wire arranging step, the wire is arranged to extend through the cavity.

8. The method according to claim 7, wherein the mold includes a second movable block, the second movable block being formed with a hole for receiving a free end of the wire extending through the cavity.

9. The method according to claim 8, wherein the wire is caused to extend through the cavity with the two movable blocks positioned close to each other so that a distance between the movable blocks is smaller than when the compacting of the powder is performed.

10. The method according to claim 1, wherein the wire arranging step comprises arranging a plurality of wires to project horizontally into the cavity prior to the compacting of the powder.

11. The method according to claim 10, wherein the wires extend in parallel with each other.

12. The method according to claim 10, wherein the wires extend in non-parallel with each other.

13. The method according to claim 10, wherein at least one of the wires is caused to project from the flat porous body by a greater amount than other wires.

* * * * *